May 19, 1970  J. KOLLER  3,512,656
OVERHEAD ROPEWAY FOR CONVEYING LOADS
Filed March 12, 1968  8 Sheets-Sheet 1

United States Patent Office

3,512,656
Patented May 19, 1970

---

3,512,656
OVERHEAD ROPEWAY FOR CONVEYING LOADS
Josef Koller, 1 Endach, 6330 Kufstein, Tyrol, Austria
Filed Mar. 12, 1968, Ser. No. 712,503
Claims priority, application Austria, Mar. 15, 1967,
A 2,487/67
Int. Cl. B66c 21/00
U.S. Cl. 212—87                                    16 Claims

ABSTRACT OF THE DISCLOSURE

An overhead ropeway for conveying loads comprises a cable with a traveling crab hanging on rollers and including clamping means with jaws for engaging the cable to lock the crab therewith. A load lifter also has clamping means for interlocking the load lifter with the crab, each of the clamping means having engaging and releasing devices controlled by power cylinders through a changeover mechanism. The rollers of the crab drive a compressor which is connected with the power cylinders for storing power for the cylinders. The clamping means for engaging the jaws on the cable forms a common displaceable integral unit with the power cylinders, the changeover mechanism being actuated when the direction of travel of the crab is reversed to operate a control cylinder through a connecting bolt on a lever of a linkage, the lever releasing the oil supply in the pressure line to the power cylinders when the required operating pressure has been attained and maintaining the control cylinder in working position until a control means connected with the load lifting means releases the linkage for the control cylinder upon complete elevation of the load lifter means to its interlocked position with the crab.

---

This invention relates to an overhead ropeway for conveying loads comprising a traveling crab hanging on rollers, said crab including clamping means with jaws for engaging the cable to lock the crab therewith, load lifter means interlockable with the crab, said clamping means having engaged and released positions controlling by power means through a changeover mechanism which is actuated when the direction of travel of the crab is reversed, a compressor in connection with a working cylinder storing the energy which is driven by the rollers of the crab.

In a known ropeway the traveling crab is automatically clamped on the cable when it is stopped, a hydraulically controlled second device releasing said load lifter means within an adjustable period of time so that it can be lowered. Disadvantageously, the flow of work is retarded by the waiting times between the two releasing operations.

It has been proposed to actuate said engaging and releasing means by the energy stored in a reservoir by the running movement of the traveling crab when the direction of travel of the latter is reversed. In this case a weight controls the engaging and releasing means through a changeover valve. The different control means are relatively complicated in this case, too, and they are susceptible to trouble and are quite expensive.

In all known ropeways, special adjustable devices for engaging and releasing the clamping means are used which are fixed on the cable and clamp the crab, when abutting, by means of a linkage and levers, thus releasing the linkage from the engaged position. All these methods demand a high material expenditure and are therefore quite expensive.

It has also been proposed to control the engaging and releasing means by a magnetic coil which is actuated by a source of current on the traveling crab. A heavy and expensive battery is required due to the high current requirement of the coil. Said source also supplies the receiving set for remote control with current; since the magnet coil is supplied at the same time, there is often too little energy available for the receiving set.

Few of the known ropeways show means for fixing the load hook. In one embodiment the load hook is supported on a tube through two cams, whereby the tube undergoes the strain and the cams produce the engaged position. Thus only the cams stressed on shearing must consist of high-quality material and disadvantageous load forces are not transmitted to the bearings. However, this construction comprises a relatively great number of component parts whose assemblage requires time-consuming accuracy. Said means are quite susceptible to trouble.

Another ropeway has been proposed in which the control operations are independent of adjustable devices. The engaging and releasing means are actuated by the energy stored in a reservoir by the running movement of the crab through a remote-control changeover valve.

The present invention proposes an improvement in which the means for clamping the jaws on the cable forms a commonly displaceable integral part with the pertaining working cylinder and the changeover mechanism actuated when the direction of travel of the crab is reversed, controls a control cylinder on a lever of a linkage through a connecting bolt which frees the oil supply in the pressure line to the working cylinder in the clamping means on the cable and in the load lifter means when the required working pressure is attained and keeps the control cylinder in working position until a control device connected with the load lifter means releases the linkage for the control cylinder from the engaged position when the load hook is completely raised.

According to a preferable embodiment of the invention, the changeover mechanism comprises a control roller which is displaceable on a shaft provided in the traveling crab. A control finger connected with a return spring glides on the cams of said shaft which upon reversal of the direction of rotation of the control roller engages in the grooves of the latter, thus holding it firmly, which causes the control roller to travel on a thread of the shaft to one of the stopping plates arranged on both sides; when it abuts against the latter, it follows the direction of rotation of the shaft; the control finger is pushed back against the action of a clamp which resiliently holds it block by a spring and takes along a control fork on which the linkage and the lever are pivotally mounted.

It is convenient to adjustably arrange at least one of the two stopping plates on the shaft, which permits to adjust the length of the distance the traveling crab has to cover for releasing the changeover mechanism. Such an adjusting possibility of a stopping plate consits e.g. in that the shaft has an axially extending groove in which the stopping plate is guided by means of a bolt and is fixed by means of a threaded screw.

In order to take along the control roller by one of the stopping plates, stops are provided on both end faces of the control roller which correspond with similar stops on the opposite faces of the stopping plates. Any other possibility of taking along the control roller in direction of rotation of the shaft would be possible, e.g. by arranging a friction-clutch coupling between the control roller and the stopping plates. The shaft on which the compressor supplying the oil pressure is arranged, is driven by a chain through a chain drive fixed on the latter; the chain is arranged through a chain drive on the axle of the rollers of the crab, a clamping device holding the chain tightly spanned.

Preferably the control finger which is controlled by the control roller is provided with a longitudinal slot by means of which it is guided on a bolt of the control fork. Stops arranged on said bolts correspond with stops on the control fork and deviate the latter upon pushing back the control fork. According to the invention the stops on the control fork are arranged in a bolt on the control fork and can be rotated against the action of springs.

The linkage actuated by the changeover mechanism for the control cylinder comprises flexibly connected levers with each other; one of the latter which is connected in its middle with the lever flexibly connected on the control fork of the changeover mechanism, is mounted on one end in the traveling crab and another lever directly connected with the latter is provided with a key-shaped nose near its end turned away, in which a fourth lever can be engaged which is provided in the traveling crab, adjacent the control knob of the control cylinder and is pivotable in direction to the control cylinder and provided with a latch; said latter lever, when in engaged position, presses the control cylinder and keeps it in working position, whereas the lever provided with the latch is lifted, when the linkage is completely raised and the lever actuating the control cylinder is disengaged and falls back from its engaged position on the control cylinder.

In order not to disengage the lever pressing on the control cylinder from its stop by propulsions during the travel of the crab and not to initiate undesired control operations, another safety lever is pivotably provided on the traveling crab according to the invention, having a nose with which it firmly holds the lever actuating the control cylinder, when the latter has engaged the nose of the control lever.

In order to prevent faulty controls, an oil-pressure controller is inserted in the oil-pressure line which only permits a swing of the control lever, when the required working pressure in the oil line has been obtained. Thus the control lever cannot give any working impulses before all conditions for an operation without accident in the whole device are given.

According to an embodiment of the invention, the oil-pressure controller comprises a lever mounted with one end in the casing of the traveling crab and connected with a return spring whose free end is guided with a bolt in a slot of the crab casing. The control lever of the linkage lies on said bolt and a cylinder which is inserted in the oil-pressure line and whose piston is adjacent the first mentioned lever, pivots said lever against the action of a spring when the working pressure of the oil is attained and gives the control lever free movement.

In the embodiment of the linkage according to the invention a spring plate which is displaceable against the action of a spiral spring and ends in a distance tube, is provided in a tube. The completely retracted load hook lifts the spring plate, one control finger on the spring plate thus lifting a control case displaceable on a guide rail provided in the tube together with a thorn adjacent the latter. Said thorn thus moves above a control striker lying in the prolongation of the rail which abuts against the safety lever for preventing undesired control operations. Said displacement is indirectly transmitted to the control lever, which causes the noses of both levers to be disengaged from their stop on the lever actuating the control cylinder. Thus said lever releases the control cylinder in such manner that the pressure oil flows back to the reservoir and the return spring of the clamping jaws on the load lifter means between the two clamps of the latter connected like scissors contracts the latter due to the working cylinder out of pressure. Thus the guide rail fixably mounted on one of the two clamping jaws through a rocking lever is tilted from its aixal position, the thorn of the control case glides from the control striker and falls back in its initial position. When the clamping jaws have been released, the load lifter means can be lowered from the cable and engages in the contracted clamping jaws.

In its initial position the control case lies on the control finger by means of a catcher under the action of a spring and is taken along by the latter during the control operation. After the change, the control finger falling back presses back the elastic catcher and engages below the latter when it has pivoted back.

Further details of the invention are hereinafter described with reference to the accompanying drawings without being limited to them.

FIG. 2 shows the side turned away of FIG. 1, FIGS. 3 and 4 show the front and back side of the load lifter means with the changeover mechanism in running position, FIGS. 8 to 12 show the clamping means on the cable, i.e.

Details and function of the ropeway according to the invention are hereinafter described issuing from the clamping position in which the traveling crab is held on the cable and the load can be lifted or lowered.

Figure 13:
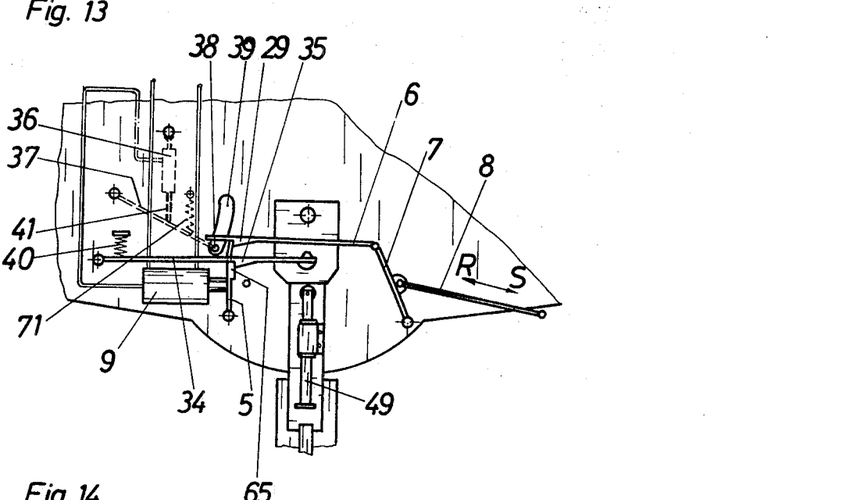
FIGS. 13 and 14 show the device for actuating the control cylinder in clamping and running positions of the traveling crab.

The control cylinder 9 is pressed by the lever 5 which is engaged in the noses 29 or 35 of the levers 6 or 34 (FIG. 13). Thus the oil supply of the pressure oil in the line 63 to the working cylinders 3 and 10 of the clamping means on the cable 2 and in the load lifter means 60 is free.

The working cylinder 3 is provided at the end of the clamping arms 59 which are flexibly connected with the clamping jaws 1 and are pivotable about a common pivot pin 77 (FIGS. 8 to 12). The actual cylinder 3 pivotally mounted on one of the clamping arms 59 and the piston on the other clamping arm press the end of the clamping arms 59 apart against the action of a return spring 56, when pressure oil is admitted, thus pressing the clamping jaws 1 to the cable 2. The two side walls of the traveling crab 4 are kept together by clamps 79 in which rest horizontally mounted clamping rollers 55. When the jaws 1 are not in engaged position, said clamping rollers 55 lying in recesses 78 of the clamping jaw sides 80 inclined in relation to the cable on both sides of said clamping rollers. When the clamping jaws 1 are clamped to the cable 2 by the working cylinder 3 and the traveling crab 4 continues to run for a short distance, the clamping rollers 55 leave the recesses 78 and ascend the key-shaped outer sides 80 of the clamping jaws 1, thus clamping the latter to the cable 2 by its own and the transport weight of the traveling crab 4.

On both sides of the clamping arms 59 return rods 57 are displaceable in the clamps of the traveling crab 4 on which spiral springs 58 are pushed whose outer ends rest on the walls of the clamps 79. When the pressure oil ceases to be admitted to the cylinder 3, the return rods 57 which rest on the common pivot pin 77 of the clamping arms 59, shift the clamping jaws 1 to their initial position due to the action of the springs 58, i.e. to the middle between the two clamps 79.

On the load lifter means 60 the working cylinder 10 has pressed apart the clamping jaws 51 flexibly mounted on the load lifter tube 42 against the action of the return spring 52 lying between said clamping jaws and has thus released the load hook 12 which can be lowered and lifted at random by the cable 54. During the lowering and lifting the control cylinder 9 always remains in pressed, i.e. engaged position.

Figure 1:
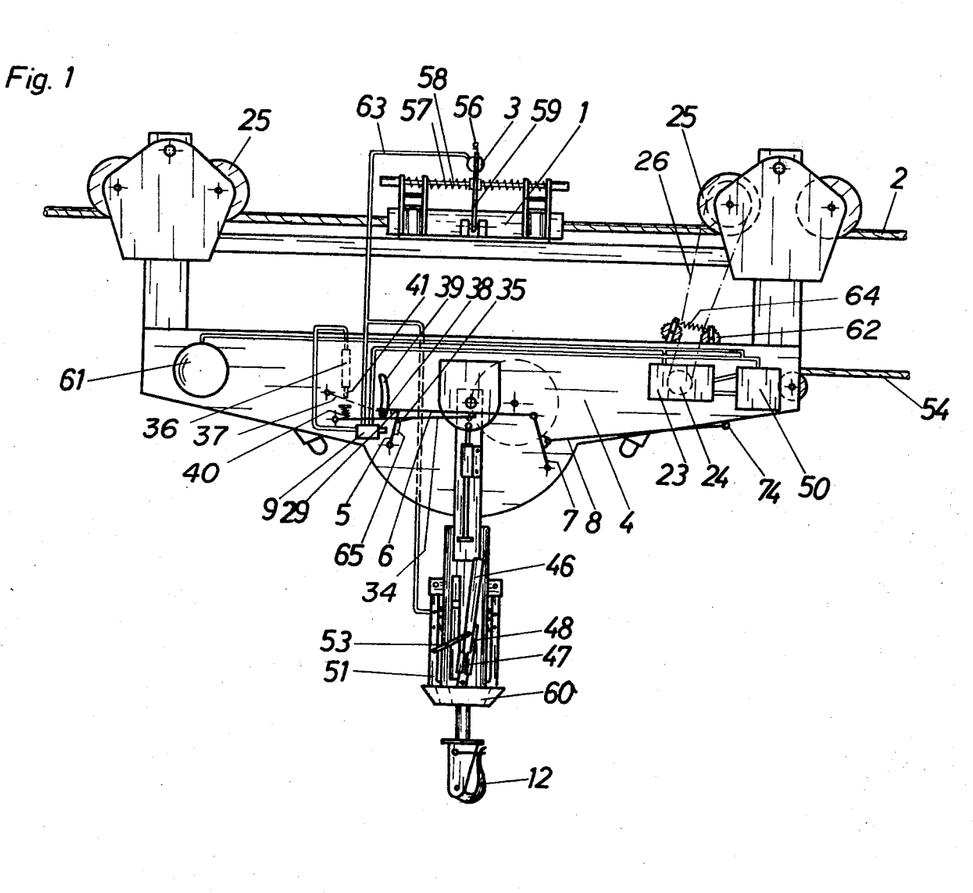
FIG. 1 is a side view of the ropeway according to the invention.
Figure 2:
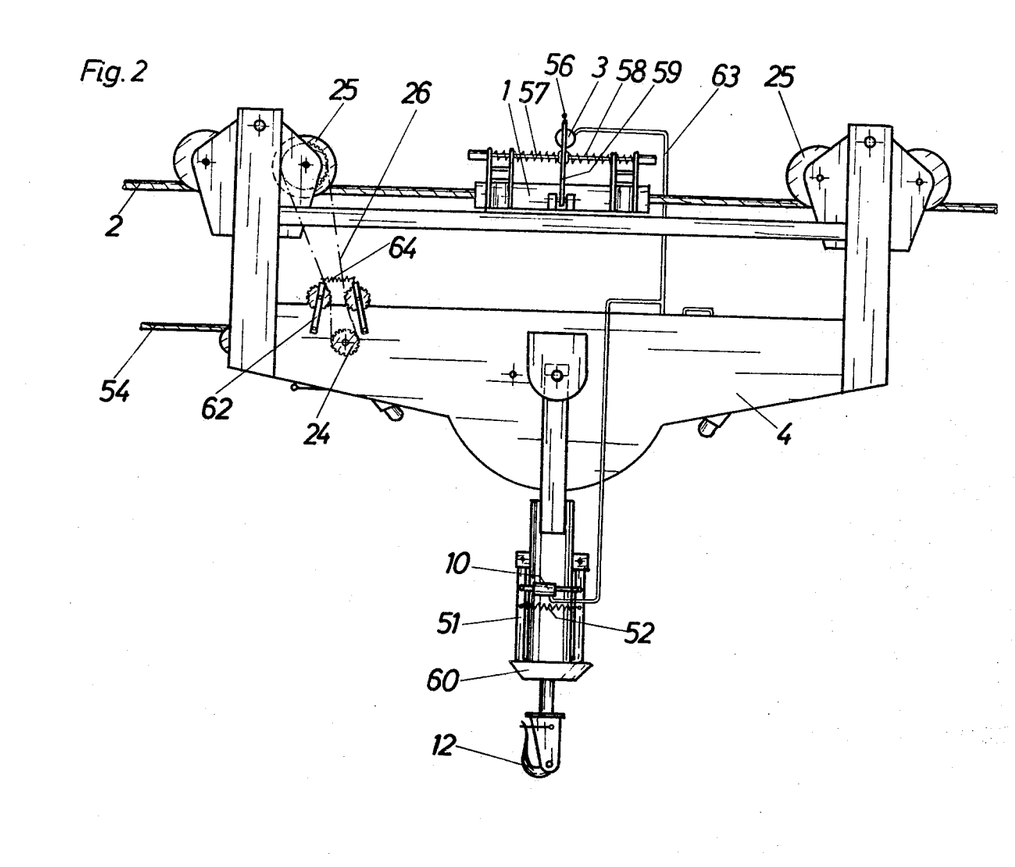
Figure 3:
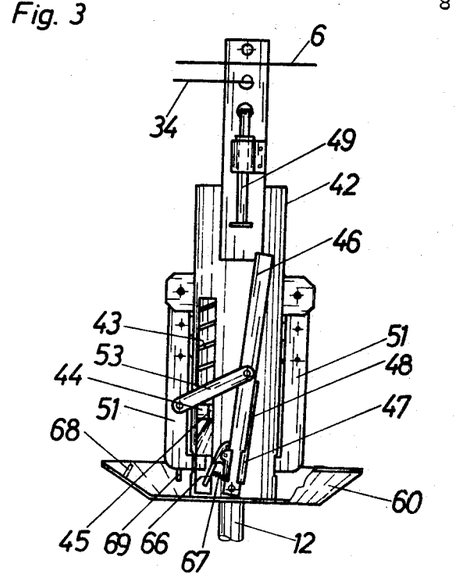
Figure 4:
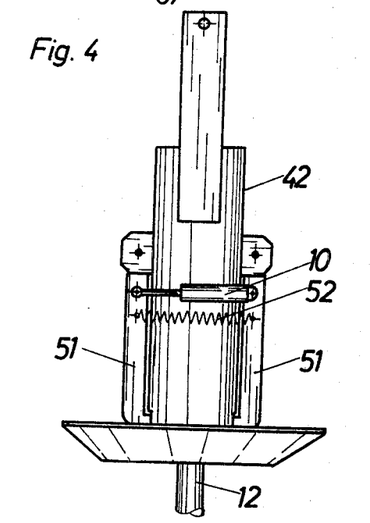
Figures 5, 12:
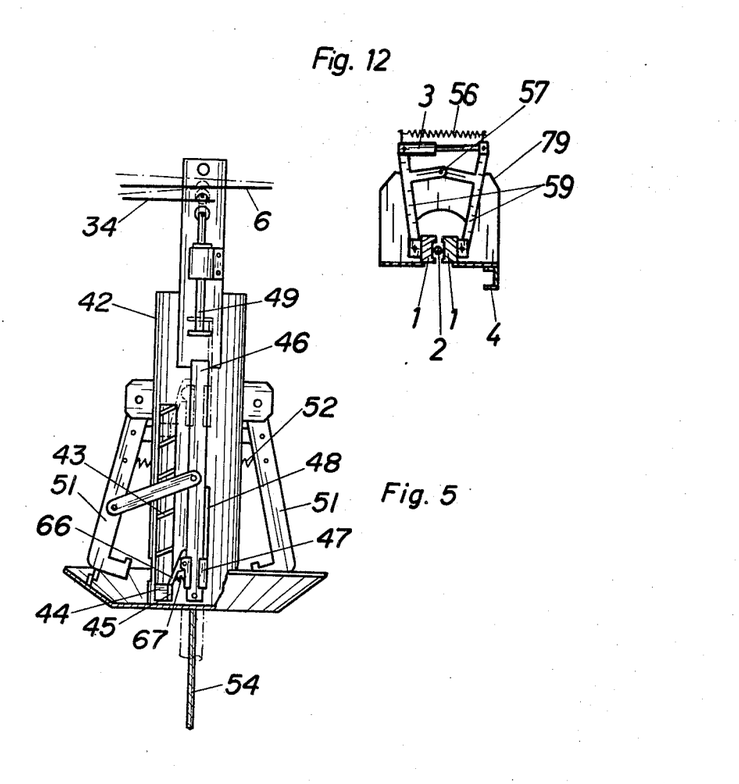
FIG. 5 shows the load lifter means in the position which permits it to be lifted and lowered (load lifter means is dash-dotted in engaged position)
FIGS. 10 and 12 are sections along line X—X of FIG. 8 in running and clamping positions.
Figure 6:
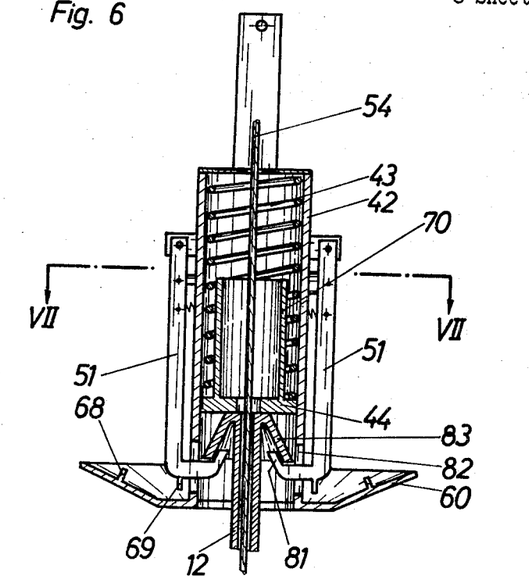
FIG. 6 is a vertical section of the load lifter means in running position of the traveling crab.
Figure 7:
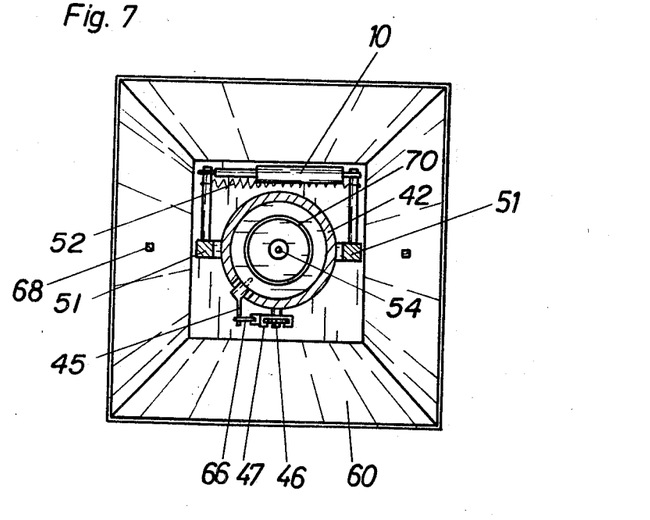
FIG. 7 is a horizontal section along line VII—VII of FIG. 6 with the spiral spring omitted.
Figure 8:
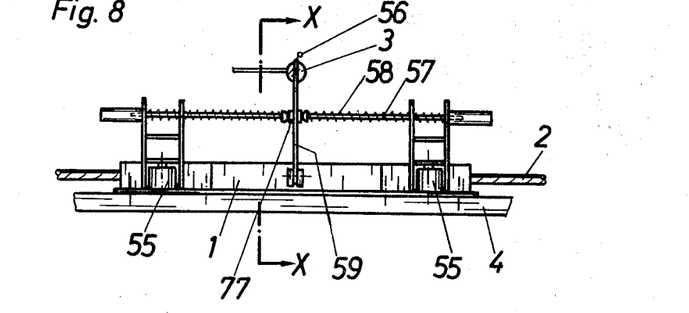
FIG. 8 is a side view.
Figure 9:
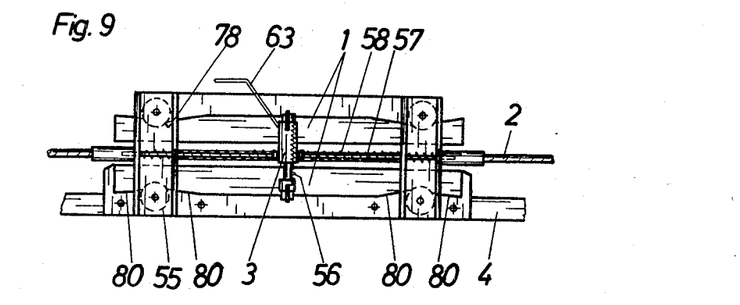
FIG. 9 is a top view in running position and FIG. 11 in clamping position.
Figure 10:
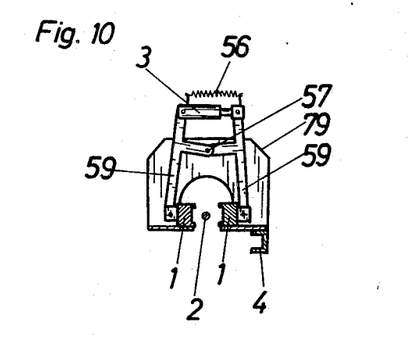
Figure 11:
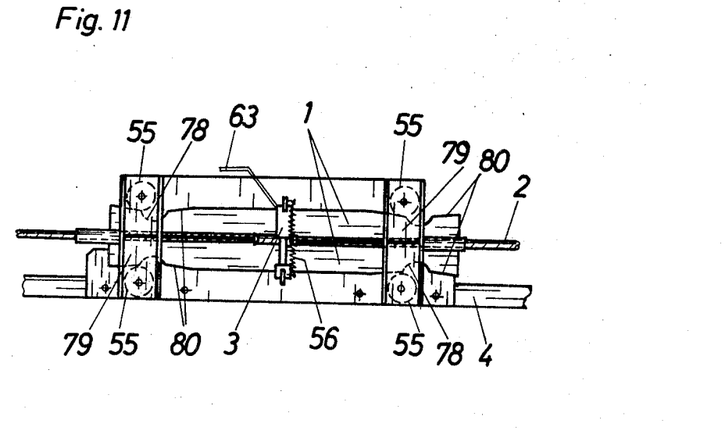

In order to put the clamped traveling crab 4 into motion, the load hook 12 has to be completely retracted. It lifts a spring plate 44 gliding in the tube 42 of the load lifter means against the action of a spiral spring 43 arranged between the tubes 42 and 70 and brings it to the dash-lined position in FIG. 5. The control finger 45 on the spring plate 44 which is adjacent a catcher 66 under the action of a spring 67, thus takes along a control case 47 which glides on a guide rail 46 and is provided with a control thorn 48. The latter lifts a control striker 49 lying in the prolongation of the rail 46 which raises the levers 34 and 6, the latter keeping the lever 5 in working position. Thus the notch 65 on the lever 5 and the end thereof disengages from the latches 35 or 29 on the levers 34 and 6 and the lever 5 falls back. Thus the control cylinder 9 is no longer pressed and thus releases the return of the oil from the working cylinders 3 and 10 to the oil reservoir 50. The return spring 52 in the load lifter means 60 contracts the clamping jaws 51, the guide rail 46 fixably mounted on one of the two clamping jaws 51 through a rocking lever 53 being tilted from its axial position in the tube 42. The thorn 48 of the control case glides from the control striker 49 and the latter falls back to the initial poistion, thus pressing back the catcher 66, and engages below the latter, when it has pivoted back by the spring 67. When the clamping jaws 1 have been released from the cable 2, the load hook 12 lowers due to its own weight and the action of the spring 43 and its roof-shaped end 83 engages in the contracted clamping jaws 51 which are bent to hooks 81 at their end and project inside through a slot-shaped opening 82 of the tube 42 (FIG. 6). When the control case 47 has glided back, the control striker 49, too, is pressed to its initial position by a spring (not shown in the drawing). In order to limit the amplitude of the clamping jaws 51 they are provided with stops 69 at their bottom side which correspond with stops 68 on the load lifter means.

When the control cylinder 9 is not pressed any more and the working cylinder 3 for the clamping jaws 1 is no longer admitted, the return spring 56 again contracts the end of the clamping arms 59 and thus opens the clamping jaws 1. This is only possible, when the traveling crab 4 has left the position clamping the jaws 1 by the cable 54 and the clamping rollers 55 again lie in the recesses 78 of the clamping jaws 1.

Upon each stop and clamping of the traveling crab 4 on the cable 2, the traveling crab 4 must cover a specific distance in opposite direction which is given by the changeover mechanism hereinafter described and can be adjusted in length. Before the construction and function of said changeover mechanism are explained, the function of the safety lever 34 is to be described.

The latter lies between the control lever 6 of a linkage 6 to 8 and the upper edge of the control striker 49. The control operation initiated by the rising load hook 12 is first transmitted to the lever 34 by the control striker 49 and indirectly through the latter to the control lever 6. The safety lever 34 fixably mounted on the traveling crab 34 is under the action of a strong compression spring 40 which keeps it engaged in the notch 65 by the nose 35. Should the control lever 6—e.g. by propulsions during the displacement of the traveling crab on the cable 2, disengage from the engaged position between its latch 29 and the lever 5, the latter nevertheless remains in its control position on the control cylinder 9. Only when the control striker 49 raises the latch 35 of the safety lever 34 and releases the control lever 6 from its engaged position with the lever 5, is the pressure on the control cylinder 9 offset. The control position as shown in FIG. 14 is given.

Figure 14:
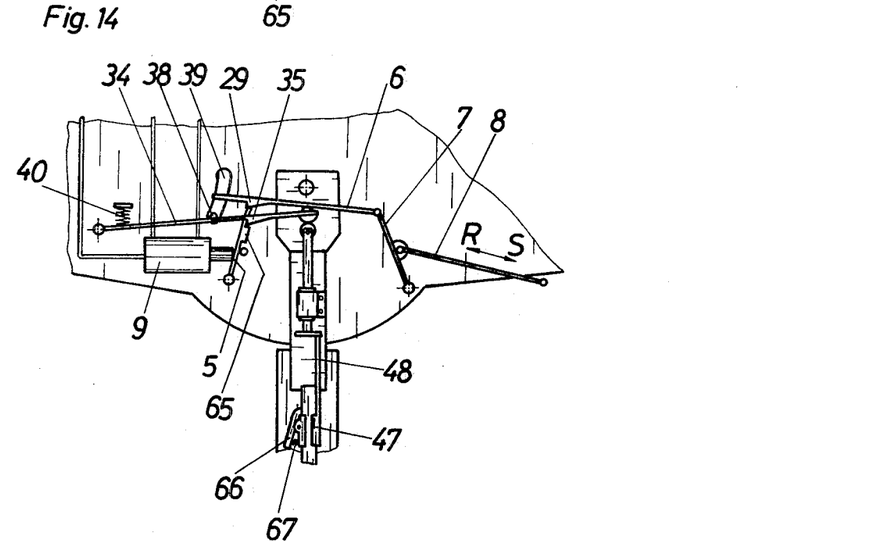

By the displacement of the traveling crab 4 caused for release from the clamping position on the cable 2, the lever 8 fixably mounted on the connecting bolt 74 (FIG. 15) of the linkage 5 to 8 is moved in direction S (FIG. 14). It takes along the lever which is pivotally connected on one end with the traveling crab 4, and the control lever 6 flexibly connected with the latter. Thus the lever 5 gliding on the key-shaped bottom side of the latch 29 can engage in its engaged position on the control lever 6. Thus the changeover mechanism—as described below—can shift the lever 8 and the linkage connected with the latter in direction R, which causes the lever 5 to reach its engaged position on the control cylinder 9. As described hereinbefore, the control position of FIG. 13 is given and the energy stored by the compressor 23 in the pressure-oil reservoir 61 and coming from the running movement of the crab 4 can be utilized as oil pressure for the working cylinders 3 and 10. The energy of motion of the traveling crab 4 is stored in that a chain drive 24 arranged on the axle of the compressor is driven by a roller 25 of the crab 4 through a chain 26, a clamping means comprising wheels 62 having a spring 64 always tightly holding the chain 26. At the end of the movement of the lever 6 in direction R, the safety lever 34 and its nose 35 engage in the notch 65 of the lever 5 and thus prevents inadvertent releases by pushes and bumps.

Such undesired releases can arrive if the changeover device makes the control lever 6 engage the lever 5 under too small oil pressure, but the compressive force does not suffice to cause the clamping on the cable by the control cylinder 9. In order to prevent the latter, an oil-pressure controller is provided comprising a lever 37 fixably mounted on the traveling crab 4 which can be pivoted by a cylinder 36 connected with the oil line 63. At its free end, the lever 37 is provided with a bolt 38 which projects through a slot 39 in the wall of the crab 4 and on which rests the end of the control lever 6. A spring 71 keeps the lever 37 in raised position. Only when the required oil pressure is attained, the piston 41 of the cylinder 36 adjacent the lever 37 pivots said lever to the bottom so that the lever 6 reaches the stop of the lever 5. Thus the control lever 6 moving in direction R can cause the control cylinder 9 to be engaged through the lever 5.

The function of the changeover mechanism comprising the chain drive 24, the drive wheel 13, the control roller 11, the stop plates 19 and the control fork 22 with the control finger 16, is described issuing from the running position which is equal to the stoppage. The compressor 23 supplying the oil pressure for the pressure reservoir 61 is arranged on the driving shaft 13.

Figure 15:
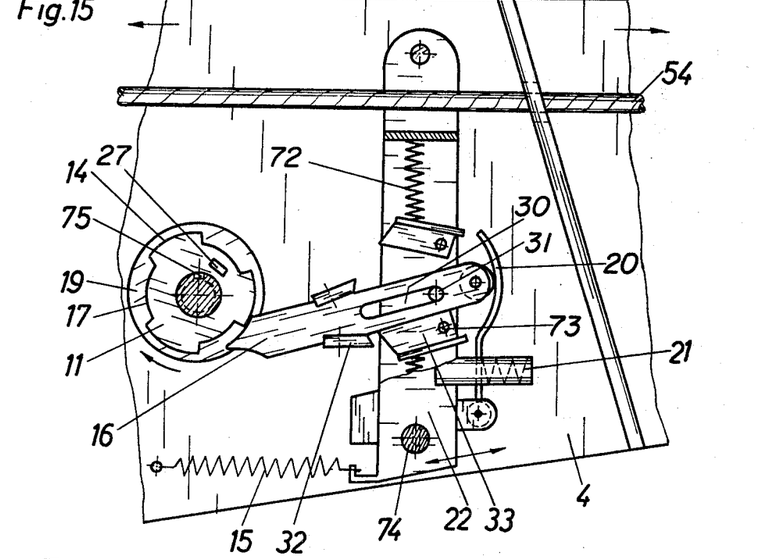
FIG. 15 is a side view of the changeover mechanism in running position, the section along line XV—XV in FIG. 16 is being taken through the traveling crab

When the traveling crab 4 runs in the direction of the arrow shown at the right top of FIG. 15, the control roller 11 rotates in the direction shown by the arc-shaped arrow. The control finger 16 glides on its cams 14. When the direction of travel of the crab 4 is reversed after the stop and the crab moves in direction R (FIGS. 13 and 14), the direction of rotation of the control roller 11 is reversed and the control finger 16 engages in the groove 17. The control roller 11 thus stopped moves on the thread 18 arranged on the driving shaft 13 in the direction of one of the stopping plates 19 provided at the left and right side of the control roller 11 on the driving shaft 13. If its stop 27 abuts against a corresponding stop 28 on said stopping plate 19, it is taken along in the direction of rotation of the driving shaft 13; thus the control finger 16 engaged in a groove 17, guided with a longitudinal slot 30 on a bolt 31 of the control fork 22, is pressed against a clamp 20 which is held in engaged position on the control finger 16 by the spring 21.

Stops 32 are firmly arranged on the control finger 16 corresponding with stops 33 which are pivotable around bolts 73 on the control fork 22 against the action of springs 72. The control finger 16 takes along the control fork 22 through said stops 32, 33, when it moves back, said control fork 22 being mounted on a bolt at the upper end in the traveling crab 4, and pivots said control fork around said bolt against the action of the return spring 15 fastened by one end on the traveling crab 4. Through the connecting bolt 74 on the control fork 22 on which the end of the lever 8 is pivotally mounted, the rotation of the control fork 22 is also transmitted to the linkage 5 to 8, which corresponds to a movement in direction S of FIGS. 13 and 14.

When the control finger 16 has passed the dead center on the control roller 11, the return spring 15 draws the control fork 22 back to its rest position, the connecting bolt 74 and the linkage 5 to 8 describing a movement in direction R of FIGS. 13 and 14. The clamp 20 presses the control finger 16 to the front under the action of the spring 21 which now glides on the upper side of the control roller 11.

By the movement described, the changeover mechanism is brought from the position shown in FIG. 13 to that of FIG. 14 according to which the crab 4 is clamped on the cable 2. When the crab 4 is again put into motion in direction R the control finger 16 glides on top of the control roller 11 without impeding the travel.

Figure 16:
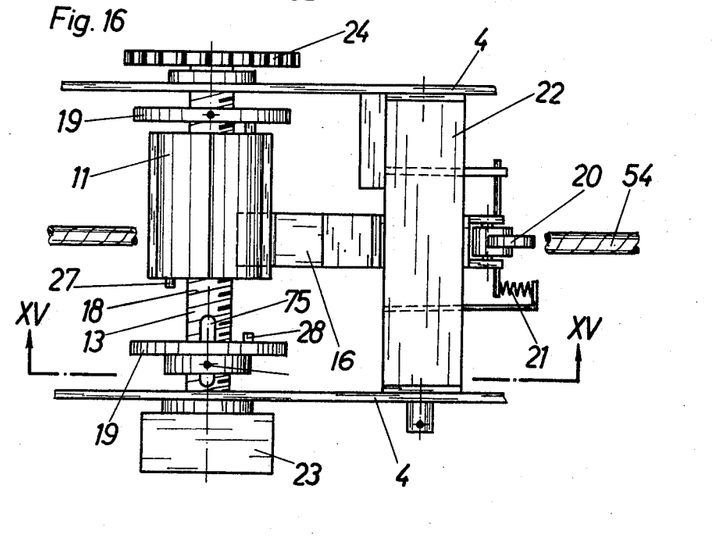
FIG. 16 is a top view of the changeover mechanism.

In order to regulate the distance the crab 4 has to cover, until its direction of travel is reversed, at least one of the two stopping plates 19 is adjustable on the driving shaft 13. In FIG. 16 this is the stopping plate near the compressor 23. The driving shaft 13 is therefore provided with a groove 75 in which the stopping plate 19 is guided by means of a bolt and can be fixed by a screw 76.

Various other embodiments are, of course, possible within the scope of the invention.

What I claim is:

1. An overhead ropeway for conveying loads comprising a cable, a traveling crab hanging on rollers, said crab including clamping means with jaws for engaging the cable to lock the crab therewith, load lifter means having clamping means for interlocking said load lifter means with the crab, each of said clamping means having engaging and releasing means controlled by power cylinders through a changeover mechanism, a compressor driven by the rollers of the crab connected with said power cylinders for storing power for said cylinders charatcerized in that the clamping means for engaging the jaws on said cable forms a common displaceable integral part with said power cylinders, said changeover mechanisms being actuated when the direction of travel of the crab is reversed, operating a control cylinder through a connecting bolt on a lever of a linkage, said lever releasing the oil supply in the pressure line to the power cylinders in the clamping means on the cable and in the load lifter means when the required operating pressure has been attained and maintaining the control cylinder in working position until a control means connected with said load lifting means releases the linkage for the control cylinder upon complete elevation of the load lifter means to its interlocked position with said crab.

2. An overhead ropeway according to claim 1 wherein said changeover mechanism comprises a control roller which is displaceably arranged on a shaft in the traveling crab, a control finger connected with a return spring gliding, on cams of said control roller, said control finger engaging grooves of said control roller when the direction of rotation in the latter is reversed, and firmly holding said control roller, said control rollers thus traveling on a thread of said shaft, said control finger being pressed back against the action of a clamp resiliently holding said finger by a spring and taking along a control fork on which the linkage comprising the lever is fixably mounted.

3. An overhead ropeway according to claim 2 wherein at least one of the two stopping plates is displaceable on the shaft.

4. An overhead ropeway according to claim 3 wherein the shaft is provided with an axially extending groove in which the stopping plate to be displaced is guided by a pin and is fixable.

5. An overhead ropeway according to claim 2 wherein corresponding stops are provided on both sides of the control roller and on the stopping plates on the sides opposite to said control roller.

6. An overhead ropeway according to claim 2 wherein the shaft on which the compressor supplying the oil pressure is arranged, is driven by the rollers of the crab through a chain drive comprising a chain, and clamping device tightly holding said chain.

7. An overhead ropeway according to claim 2 wherein said control finger is provided with a longitudinal slot by which it is guided on a bolt of the control fork, and stops provided on said control roller and corresponding with stops on said control fork pivoting the latter upon pressing back the control finger.

8. An overhead ropeway according to claim 1 wherein the linkage of the control cylinder actuated by the changeover mechanism comprises levers fixably connected with each other, one of said levers which is connected in the middle with the lever fixably mounted on the control fork of the changeover mechanism, being mounted on one end in the traveling crab and another lever directly connected with the first is provided with a key-shaped nose near its end turned away in which a fourth lever can be engaged which is mounted in the crab, is adjacent the control knob of the control cylinder and pivotable in a direction to the control cylinder, provided with a latch, said fourth lever pressing the control cylinder in engaged position and keeping it in working position, whereas the lever provided with the latch is lifted upon complete elevation of the load lifting means and the lever actuating the control cylinder is disengaged and falls back from its engaged position on the control cylinder.

9. An overhead ropeway according to claim 8 wherein below the control lever provided with said latch, another safety lever pivotally arranged on the traveling crab is provided which has a nose, said nose additionally holding said lever actuating the control cylinder when the latter has engaged in the nose of the control lever.

10. An overhead ropeway according to claim 1 wherein an oil-pressure controller is provided in the oil-pressure line which only permits the control lever to be pivoted when the required operating pressure is obtained.

11. An overhead ropeway according to claim 10 wherein the oil-pressure controller comprises a lever mounted at one end in the casing of the traveling crab and connected with a return spring, the free end of said lever being guided by a bolt in a slot in the casing of the traveling crab, the control lever of the linkage resting on said bolt, a cylinder inserted in the oil-pressure line adjacent the first lever by its piston, pivoting said lever against the action of a spring when the operating pressure of the oil is attained, thus giving free movement to the control lever.

12. An overhead ropeway according to claim 9 wherein the load lifter means comprises a tube in which a spring plate displaceable against the action of a spiral spring and ending in a distance tube is mounted, the completely retracted load lifter means lifting said spring plate, one control finger thus lifting a control case on the spring plate comprising a thorn adjacent a guide rail axially arranged in the tube, said thorn lifting a control striker lying in the prolongation of the rail, said control striker abutting against the safety lever and transmitting the movement indirectly through the latter to the control lever, thus disengaging both noses from their engaged position on the lever actuating control cylinder, said lever falling back and releasing the control cylinder in such manner that the pressure oil flows back to the reservoir and the return spring of the clamping jaws on the load lifter means, due to the working cylinder out of pressure, between the load lifter clamping jaws connected as scissors, contracts the latter, the guiding rail fixably arranged through a rocking lever on one of the two clamping jaws being tilted from its axial position in the tube and the thorn of the control case gliding from the control striker falls back to the initial position, which causes the load lifter means to be lowered upon release of the clamping jaws from the cable due to its own weight and the action of the spring and to be engaged in the contracted clamping jaws.

13. An overhead ropeway according to claim 12 wherein the control striker rests on the control finger in the initial position of the changeover mechanism by means of a catcher under the action of a spring and is taken along during the control operation, said control finger pressing back the elastic catcher upon reversal and return to the initial position and engaging below said catcher, when the catcher has pivoted back.

14. An overhead ropeway according to claim 7 wherein the stops on the control fork are pivotally mounted in a bolt against the action of springs.

15. An overhead ropeway according to claim 1 wherein in the middle of the side of the clamping jaws clamping arms are fixably mounted, said clamping arms being fixably connected with each other through an axial bolt and supporting the power cylinder between their ends and the return spring in parallel to said power cylinder, horizontally mounted clamping rollers resting in recesses near the ends of the clamping jaw sides in clamps of the traveling crab, said clamping rollers abutting against the side walls of the clamping jaws partly inclined in relation to the cable on both sides of the recesses upon displacement of the clamping arms in or against the direction of travel of the crab against the return rods displaceably mounted in the clamps and under the action of spiral springs spanning said clamping roller, said clamping roller clamping the jaws on the cable.

16. An overhead ropeway according to claim 12 wherein the clamping jaws of the load lifter means are provided with hooks on their free ends which engage through slot-like openings in the tube of the load lifter means in the clamping position and engage below a roof-shaped end of the load lifter means upon lowering the latter.

References Cited

UNITED STATES PATENTS

| | | | |
|---|---|---|---|
| 2,790,561 | 4/1957 | Wyssen | 212—122 |
| 3,058,601 | 10/1962 | Wyssen | 212—122 |
| 3,311,243 | 3/1967 | Bachmann | 212—87 |

HARVEY C. HORNSBY, Primary Examiner

U.S. Cl. X.R.

212—97, 109, 122; 294—78, 88, 106